(12) United States Patent
DePavia et al.

(10) Patent No.: US 10,323,510 B2
(45) Date of Patent: Jun. 18, 2019

(54) DOWNHOLE SENSING FOR ELECTROMAGNETIC TELEMETRY

(71) Applicant: Schlumberger Technology Corporation, Sugar Land, TX (US)

(72) Inventors: Luis Eduardo DePavia, Sugar Land, TX (US); Dean Homan, Sugar Land, TX (US); Robert Tennent, Katy, TX (US); Gaelle Jannin, Houston, TX (US); Liang Sun, Katy, TX (US); Jiuping Chen, San Pablo, CA (US)

(73) Assignee: SCHLUMBERGER TECHNOLOGY CORPORATION, Sugar Land, TX (US)

(*) Notice: Subject to any disclaimer, the term of this patent is extended or adjusted under 35 U.S.C. 154(b) by 26 days.

(21) Appl. No.: 15/620,009

(22) Filed: Jun. 12, 2017

(65) Prior Publication Data

US 2018/0003042 A1   Jan. 4, 2018

Related U.S. Application Data

(60) Provisional application No. 62/357,061, filed on Jun. 30, 2016.

(51) Int. Cl.
| | | |
|---|---|---|
| *E21B 47/12* | (2012.01) | |
| *G01V 11/00* | (2006.01) | |
| *G01V 3/30* | (2006.01) | |
| *E21B 17/02* | (2006.01) | |
| *E21B 47/01* | (2012.01) | |
| *H01Q 1/04* | (2006.01) | |
| *E21B 47/022* | (2012.01) | |

(52) U.S. Cl.
CPC .......... *E21B 47/122* (2013.01); *E21B 17/028* (2013.01); *E21B 47/011* (2013.01); *E21B 47/02216* (2013.01); *E21B 47/121* (2013.01); *G01V 3/30* (2013.01); *G01V 11/002* (2013.01); *H01Q 1/04* (2013.01)

(58) Field of Classification Search
CPC .................................................. G01V 11/002
See application file for complete search history.

(56) References Cited

U.S. PATENT DOCUMENTS

| | | | |
|---|---|---|---|
| 8,400,326 B2 | 3/2013 | Codazzi | |
| 9,638,028 B2 | 5/2017 | Gao et al. | |
| 9,702,240 B2* | 7/2017 | Bittar | ...................... E21B 47/00 |
| 2006/0035591 A1* | 2/2006 | Young | ...................... E21B 47/12 |
| | | | 455/63.1 |
| 2010/0039286 A1* | 2/2010 | Robbins | ............... G01V 11/002 |
| | | | 340/855.3 |
| 2011/0106514 A1* | 5/2011 | Omeragic | ............... G01V 11/00 |
| | | | 703/10 |
| 2012/0059521 A1* | 3/2012 | Iversen | ................... E21B 44/00 |
| | | | 700/275 |

(Continued)

*Primary Examiner* — Brian A Zimmerman
*Assistant Examiner* — Sara B Samson

(57) ABSTRACT

A method for recovering data from a downhole tool in a wellbore includes measuring an electromagnetic signal using first and second sensors. At least a portion of the electromagnetic signal is transmitted by a downhole tool positioned in a first wellbore. The first and second sensors are each positioned at a different location along a length of a second wellbore. The electromagnetic signal measured by the first and second sensors is decoded to recover a property measured by the downhole tool.

18 Claims, 8 Drawing Sheets

(56) References Cited

U.S. PATENT DOCUMENTS

| | | | |
|---|---|---|---|
| 2014/0077963 A1* | 3/2014 | Dankers | E21B 41/0021 340/853.1 |
| 2016/0108724 A1 | 4/2016 | Jarrot | |
| 2018/0003043 A1 | 1/2018 | Gelman et al. | |
| 2018/0003044 A1 | 1/2018 | Kusuma et al. | |
| 2018/0003527 A1 | 1/2018 | Jarrot et al. | |
| 2018/0003849 A1 | 1/2018 | Chung et al. | |
| 2018/0038225 A1* | 2/2018 | Wilson | E21B 47/123 |

* cited by examiner

DOWNHOLE SENSING FOR ELECTROMAGNETIC TELEMETRY

CROSS-REFERENCE TO RELATED APPLICATION

This application claims priority to and the benefit of U.S. Provisional Application No. 62/357,061, filed on Jun. 30, 2016, the entirety of which is incorporated herein by reference.

BACKGROUND

Conventional electromagnetic ("EM") telemetry employs two or more stakes (i.e., electrodes) placed in the ground to detect a signal. The signal may include an electrical current, and the current may cause a voltage differential between the stakes due to the resistivity of the ground. The signal includes an EM telemetry portion that is transmitted from a downhole tool in a wellbore. The EM telemetry portion includes encoded measurement data captured by the downhole tool. The signal also includes an electrical noise portion due to equipment (e.g., motors, generators, pumps, etc.) at the surface. It is oftentimes difficult to distinguish the EM telemetry portion of the signal from the electrical noise portion of the signal. To make matters more difficult, the EM telemetry portion of the signal is largely attenuated by the subterranean formation between the downhole tool and the stakes at surface. Furthermore, there may be other EM telemetry tools interfering with the desired signal.

SUMMARY

This summary is provided to introduce a selection of concepts that are further described in the detailed description. This summary is not intended to identify key or essential features of the claimed subject matter, nor is it intended to be used as an aid in limiting the scope of the claimed subject matter.

A method for recovering data from a downhole tool in a wellbore is disclosed. The method includes measuring an electromagnetic signal using first and second sensors. At least a portion of the electromagnetic signal is transmitted by a downhole tool positioned in a first wellbore. The first and second sensors are each positioned at a different location along a length of a second wellbore. The electromagnetic signal measured by the first and second sensors is decoded to recover a property measured by the downhole tool.

In another embodiment, the method includes measuring an electromagnetic signal using a toroidal sensor. At least a portion of the electromagnetic signal is transmitted by a downhole tool positioned in a first wellbore. The electromagnetic signal measured by the toroidal sensor is decoded to recover a property measured by the downhole tool.

A system for recovering data from a downhole tool in a wellbore is also disclosed. The system includes a first sensor that measures an electromagnetic signal transmitted by a downhole tool in a first wellbore. The first sensor is in a second wellbore. The system also includes a second sensor that measures the electromagnetic signal transmitted by the downhole tool. The first and second sensors are each positioned at a different location along a length of the second wellbore. The system also includes a computer system that determines a voltage differential between the first and second sensors and decodes the voltage differential to recover a property measured by the downhole tool.

BRIEF DESCRIPTION OF THE DRAWINGS

The accompanying drawings, which are incorporated in and constitute a part of this specification, illustrate embodiments of the present teachings and together with the description, serve to explain the principles of the present teachings. In the figures.

DETAILED DESCRIPTION

Reference will now be made in detail to specific embodiments illustrated in the accompanying drawings and figures. In the following detailed description, numerous specific details are set forth in order to provide a thorough understanding. However, it will be apparent to one of ordinary skill in the art that the disclosure may be practiced without these specific details. In other instances, well-known methods, procedures, components, circuits, and networks have not been described in detail so as not to obscure aspects of the embodiments.

The terminology used in the description is for the purpose of describing particular embodiments and is not intended to be limiting. As used in the description and the appended claims, the singular forms "a," "an" and "the" are intended to include the plural forms as well, unless the context clearly indicates otherwise. It will also be understood that the term "and/or" as used herein refers to and encompasses any possible combinations of one or more of the associated listed items. It will be further understood that the terms "includes," "including," "comprises" and/or "comprising," when used in this specification, specify the presence of stated features, integers, operations, elements, and/or components, but do not preclude the presence or addition of one or more other features, integers, operations, elements, components, and/or groups thereof. Further, as used herein, the term "if" may be construed to mean "when" or "upon" or "in response to determining" or "in response to detecting," depending on the context.

Figure 1:
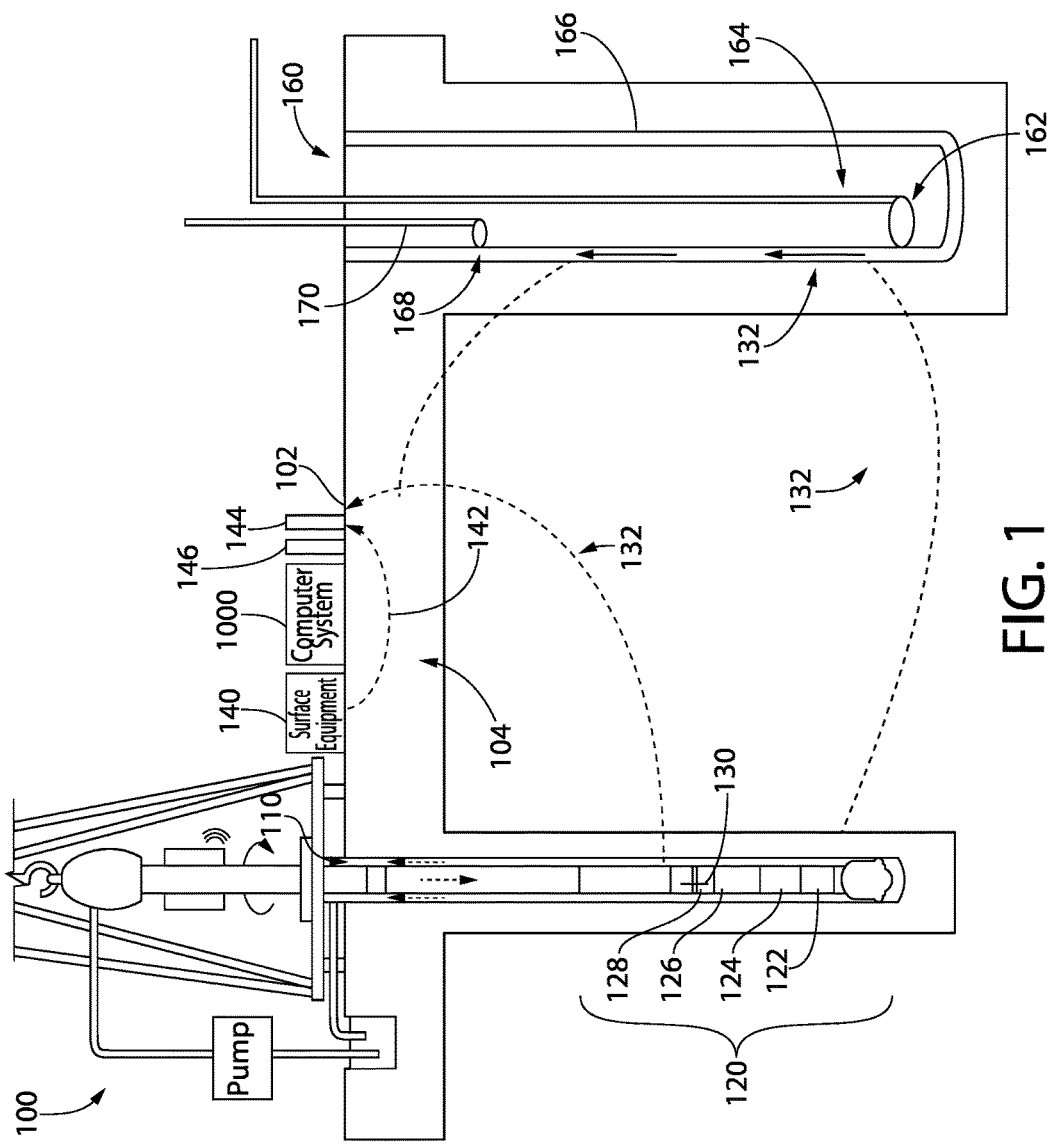
FIG. 1 illustrates a schematic side view of first and second wellbores in a subterranean formation, according to an embodiment.

FIG. 1 illustrates a schematic view of an EM telemetry system 100 in a wellsite having a first wellbore 110 and a second wellbore 160 formed in a subterranean formation 104, according to an embodiment. The first wellbore 110 may have a downhole tool 120 positioned therein. The downhole tool 120 may be or include a rotary steerable system ("RSS") 122, a motor 124, one or more logging-while-drilling ("LWD") tools 126, one or more measurement-while-drilling ("MWD") tools 128, or a combination thereof. The LWD tool 126 may be configured to measure one or more formation properties and/or physical properties as the first wellbore 110 is being drilled or at any time thereafter. The MWD tool 128 may be configured to measure one or more physical properties as the first wellbore 110 is being drilled or at any time thereafter. The formation properties may include resistivity, density, porosity, some velocity, gamma rays, and the like. The physical properties may include pressure, temperature, wellbore caliper, wellbore trajectory, a weight-on-bit, torque-on-bit, vibration, shock, stick slip, and the like. The measurements from the LWD tool 126 may be sent to the MWD tool 128. The MWD tool 128 may then group the sets of data from the LWD tool 126 and the MWD tool 128 and prepare the data for transmission to the surface 102.

The data may be transmitted to the surface via electromagnetic ("EM") telemetry, mud pulse telemetry, or the like. When using EM telemetry to transmit the data from the downhole tool 120 in the first wellbore 110 to the surface 102, a coding method is used. For example, a predetermined carrier frequency may be selected and any suitable modulation method, e.g., phase shift keying ("PSK"), frequency shift keying ("FSK"), continuous phase modulation ("CPM"), quadrature amplitude modulation ("QAM"), or orthogonal frequency division multiplexing ("OFDM"), may be used to superpose the bit pattern onto the carrier wave. In another embodiment, a baseband line code, e.g., pulse position modulation, Manchester coding, biphase coding, or runlength limited codes such as 4b/5b or 8b/10b coding, may be used to superpose the bit pattern onto a waveform suitable for transmission across the MWD channel. This coded signal is applied as a voltage differential across an electrical insulation layer (e.g., ceramic, peek, hard plastic) 130 positioned between upper and lower portions of the downhole tool 120. Due to the voltage differential, an EM telemetry signal (e.g., electrical current) 132 is generated that travels through the subterranean formation 104. More particularly, the EM telemetry current density signal 132 travels from the lower portion of the downhole tool 120, out into the subterranean formation 104, and bends back toward the upper portion of the downhole tool 120, in an almost semi-elliptical like-shape as determined by the boundary conditions of the subterranean formation 104. The EM telemetry signal 132 from the downhole tool 120 may become attenuated proceeding away from the downhole tool 120 (e.g., upward toward the surface 102) due to the resistivity of the subterranean formation 104. More particularly, the EM telemetry signal 132 may be attenuated in highly conductive portions of the subterranean formation 104, which may shunt the EM telemetry signal 132, and/or the EM telemetry signal 132 may be attenuated by highly resistive portions of the subterranean formation 104, which may restrict the flow of the EM telemetry signal 132 to the surface 102.

Surface equipment may 140 be positioned at the surface 102. The surface equipment 140 may be or include a motor, a generator, a pump, or the like. The surface equipment 140 may be poorly grounded to one-another, which may introduce noise signals (e.g., electrical current) 142 into the subterranean formation 104 near the surface 102. The noise signals 142 from the surface equipment 140 may become attenuated proceeding away from the surface equipment 140 due to the resistivity of the subterranean formation 104. Thus, in one example, the noise signals 142 from the surface equipment 140 may become more and more attenuated proceeding downward, deeper into the subterranean formation 104.

In one embodiment, one or more surface sensors (two are shown: 144, 146) may be positioned at the surface 102. The surface sensors 144, 146 may be or include metallic stakes driven into the surface 102. Although not shown, one of the surface sensors (e.g., sensor 144) may be coupled to a blow-out preventer ("BOP") of the first wellbore 110. The surface sensors 144, 146 may measure the EM telemetry signal 132 and the noise signal 142 in the subterranean formation 104. The signals 132, 142 measured by the surface sensors 144, 146 may have an EM telemetry portion (e.g., from the EM telemetry signal 132 transmitted from the downhole tool 120), and an electrical noise portion (e.g., from the noise signal 142 generated by the noise-generating equipment 140 at the surface 102).

The surface sensors 144, 146 may detect/measure the signals 132, 142 in the subterranean formation 104. A voltage differential may then be determined between the surface sensors 144, 146 using the signals 132, 142 and the resistance between the surface sensors 144, 146. The resistance may be due to the resistivity of the subterranean formation 104. The resistance between the surface sensors 144, 146 is oftentimes from about 25 ohms to about 100 ohms (e.g., about 50 ohms).

The signals 132, 142 (e.g., current or voltage differential) may be transmitted from the surface sensors 144, 146 to a computer system 1000. The signals 132, 142 (e.g., current or voltage differential) received by the computer system 1000 may include an EM telemetry portion from the downhole tool 120 and an electrical noise portion from the surface equipment 140. The computer system 1000 may identify and decode the EM telemetry portion to recover the properties measured by the downhole tool 120. Both signals 132, 142 may be travelling in a substantially-horizontal direction proximate to the surface 102 when detected by the surface sensors 144, 146, causing the electrical noise portion to be "electrically-coupled" to the EM telemetry portion. This may make it difficult to distinguish the EM telemetry portion from the electrical noise portion.

To improve the signal-to-noise ratio ("SNR") between the EM telemetry portion and the electrical noise portion, a first sensor 162 may be positioned in the second wellbore 160. The second wellbore 160 may be laterally-offset from the first wellbore 110 from about 10 m to about 100 m, about 100 m to about 500 m, about 500 m to about 1000 m, about 1000 m to about 3000 m, or more. The first sensor 162 may be or include an electrode, a magnetometer, a capacitive sensor, a current sensor, a Hall-effect sensor, a toroid, a solenoid, a resistive gap, or a combination thereof. The first sensor 162 may be placed in a substantially vertical portion of the second wellbore 160, a lateral portion of the second wellbore 160, or in the heel therebetween. In one example, the first sensor 162 may be placed in a lateral portion of the second wellbore 160 that is extending toward the first wellbore 110. The depth of the first sensor 162 may be greater than or equal to the depth of the downhole tool 120, as measured vertically from the surface 102; however, in other embodiments, the depth of the first sensor 162 may be less than the depth of the downhole tool 120. A first insulated cable 164 may be coupled the first sensor 162. The first cable 164 may be configured to transmit the measurements captured by the first sensor 162 to the surface 102.

The second wellbore 160 may be "open-hole" or have a casing 166 positioned therein. When the second wellbore 160 has the casing 166 (or other metallic tubular member) positioned therein, the first sensor 162 may be in contact with the casing 166. In other embodiments, the first sensor 162 may not be in direct contact with the casing 166 and may instead sense the EM telemetry signal 132 through a liquid (e.g. brine) or through other means such as a magnetometer, capacitive coupling, etc. at a point in the second wellbore 160.

At least a portion of the EM telemetry signal 132 from the downhole tool 120 in the first wellbore 110 may be measured by the first sensor 162 in the second wellbore 160. For example, the EM telemetry signal 132 may flow into the casing 166 in the second wellbore 160, and the first sensor 162 may measure the EM telemetry signal 132 in the casing 166 proximate to the first sensor 162. The measurement data from the first sensor 162 may be transmitted up to the surface 102 through the cable 164 in the second wellbore 160.

Once the EM telemetry signal 132 reaches the casing 166 in the second wellbore 160, at least a portion of the EM telemetry signal 132 may flow up the casing 166 in the second wellbore 160 toward the surface 102, which is the path of least resistance. A second sensor 168 may be configured to measure the EM telemetry signal 132 at a different location than the first sensor 162. As shown, the second sensor 168 is positioned within the second wellbore 160 and above the first sensor 162. In another embodiment, the second sensor 168 may be positioned at the surface 102 proximate to the top of the second wellbore 160 (e.g., coupled to a wellhead or BOP of the second wellbore 160). The second sensor 168 may also be or include an electrode, a magnetometer, a capacitive sensor, a current sensor, a Hall-effect sensor, a toroid, a solenoid, a resistive gap, or a combination thereof. The second sensor 168 may be in contact with the casing 166 in the second wellbore 160 or in contact with an intermediate conductive member that is in contact with the casing 166 in the second wellbore 160, to enable the second sensor 168 to detect the EM telemetry signal 132 at that location. A second insulated cable 170 may be coupled the second sensor 168. The second cable 170 may be configured to transmit the measurements captured by the second sensor 168 to the surface 102.

As will be appreciated, the EM telemetry signal 132 flowing through the casing 166 at the location of the first and second sensors 162, 168 may be different. For example, the EM telemetry signal 132 measured by the second sensor 168 may be smaller than the EM telemetry signal 132 measured by the first sensor 162 because a portion of the EM telemetry signal 132 "leaks" back to the downhole tool 120 through the subterranean formation 104 before reaching the second sensor 168. This leaking effect may be more pronounced for casing materials that are less conductive or where a joint between two casing joints introduces a series resistance. In addition, the first and second sensors 162, 168 may also be affected differently by the noise signals 142 produced by the surface equipment 140. For example, the noise signals 142 that reach the first sensor 162 may be smaller than the noise signals 142 circulating in proximity to the second sensor 168 due to the additional distance (and corresponding resistance) that the noise signal 142 travels to reach the first sensor 162. Said another way, as depth of the downhole tool 120 increases, the amplitude of the noise signals 142 from the surface 102 may be reduced due to shunting of the noise current loops in the conductive formations and attenuation due to interleaved resistive layers.

As the downhole tool 120 drills deeper into the subterranean formation 104, the EM telemetry signal 132 transmitted by the downhole tool 120 may be attenuated on its path to the surface 102. This attenuation is greater in highly-conductive formations that shunt the EM telemetry signal 132 and can be worsened by the presence of highly resistive layers which restrict the flow of the EM telemetry signal 132 to the surface 102.

A distance between the first and second sensors 162, 168 may be known. The distance may be, for example, from about 10 m to about 50 m, about 50 m to about 100 m, about 100 m to about 250 m, about 250 m to about 500 m, about 500 m to about 1000 m, or more. While it was previously assumed that the resistance between two points on the casing 166 was zero or close to zero, over larger distances, the resistance is no longer nominal. As a result, with the distance known, the resistance of the casing 166 between the first and second sensors 162, 168 may be determined. The resistance may be, for example, from about 0.1 ohms per 1000 m to about 5 ohms per 1000 m, from about 0.2 ohms per 1000 m to about 2 ohms per 1000 m, or from about 0.3 ohms per 1000 m to about 1 ohm per 1000 m. In one specific example, the resistance may be about 0.5 ohms per 1000 m. Thus, in one example, if there is 10,000 m of casing 166 between the first and second sensors 162, 168, the resistance may be about 5 ohms. At least a portion of the casing 166 may be substantially vertical, which may cause the EM telemetry signal 132 to flow in a substantially vertical direction. As a result, the EM telemetry signal 132 from the downhole tool 120 (e.g., the EM telemetry portion) may be substantially perpendicular to the noise signal 142 from the surface equipment 140 at the surface 102 (e.g., the electrical noise portion), which may reduce the electrical coupling between the two portions.

The first and/or second sensor 162, 168 may be positioned to maximize the EM telemetry signal 132 (e.g., current) that is measured. In addition, the first and/or second sensor 162, 168 may be positioned to maximize the resistive path that the EM telemetry signal 132 travels through. When the subterranean formation 104 is highly resistive, the first and/or second sensor 162, 168 may be positioned in a conductive layer of the subterranean formation 104 below a highly resistive layer.

The sensors 144, 146, 162, 168 may be positioned in and/or configured to detect signals from a single downhole tool 120 in a signal wellbore 110 or multiple downhole tools 120 in multiple wellbores 110, 160, etc. The sensors 144, 146, 162, 168 may operate on land or in marine environments. The sensors 144, 146, 162, 168 may communicate unidirectionally or bi-directionally. In some embodiments, the sensors 144, 146, 162, 168 may communicate with each other and/or with other components of the downhole tools 120 or EM telemetry system 100 to communicate in a full or partial duplex manner. For example, in some embodiments, the communication channels between the sensors 144, 146, 162, 168 may be used for full duplex operation and may communicate bi-directionally and simultaneously. The sensors 144, 146, 162, 168 may use automation, downlinking, noise cancellation, etc., and may operate with acquisition software and/or human operators.

Figure 2:
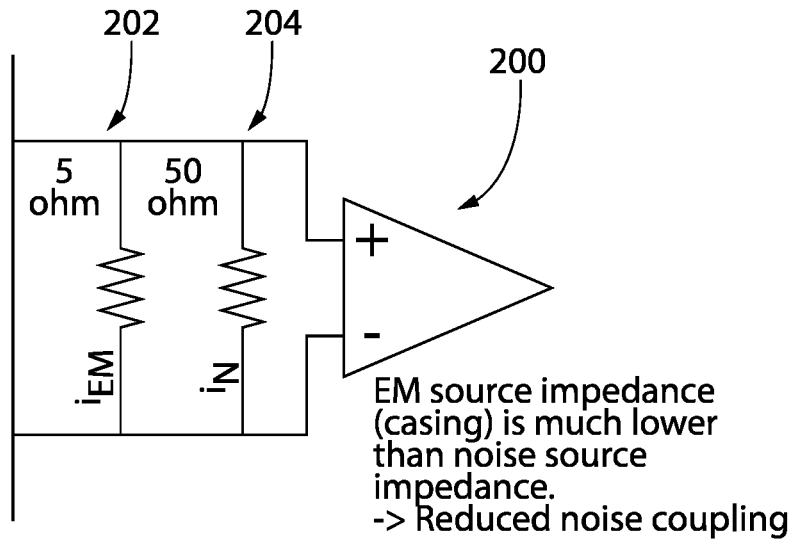
FIG. 2 illustrates a schematic view of an amplifier that receives signals from the first and second sensors, according to an embodiment.

FIG. 2 illustrates a schematic view of a differential amplifier 200 that measures the voltage difference across the sensors 162, 168, which can be electrodes in contact with the casing 166, according to an embodiment. The signals 132, 142 measured by the first and second sensors 162, 168 may be introduced into the differential amplifier 200 to generate the voltage differential. This embodiment reduces the noise that couples both the sensors 162, 168 (e.g., common mode noise). As shown, the impedance from the sensors 162, 168 to the input of the differential amplifier may be very low (e.g., equal to the casing resistance for that section of casing 166 for the example in which the sensors 162, 168 contact the casing 166). In this embodiment, the low source impedance provides high noise immunity as compared to a different embodiment that measures the differential signal between the sensor 162 and a stake placed at the surface 102. The latter embodiment may have higher impedance and also may couple the noise signals 142 from the surface equipment 140. In at least one embodiment, the impedance of the front end may be varied to match the resistance of the casing 166, which may be roughly known per unit of distance (e.g., meter).

The amplifier 200 may have a high common mode rejection ratio, which removes common mode noise. In addition to the common mode rejection benefit of multiple sensors 162, 168 in the second wellbore 160, the multiple sensors 162, 168 may provide the ability to capture the EM telemetry signal 132 from the downhole tool 120 throughout the full interval.

Figure 3:
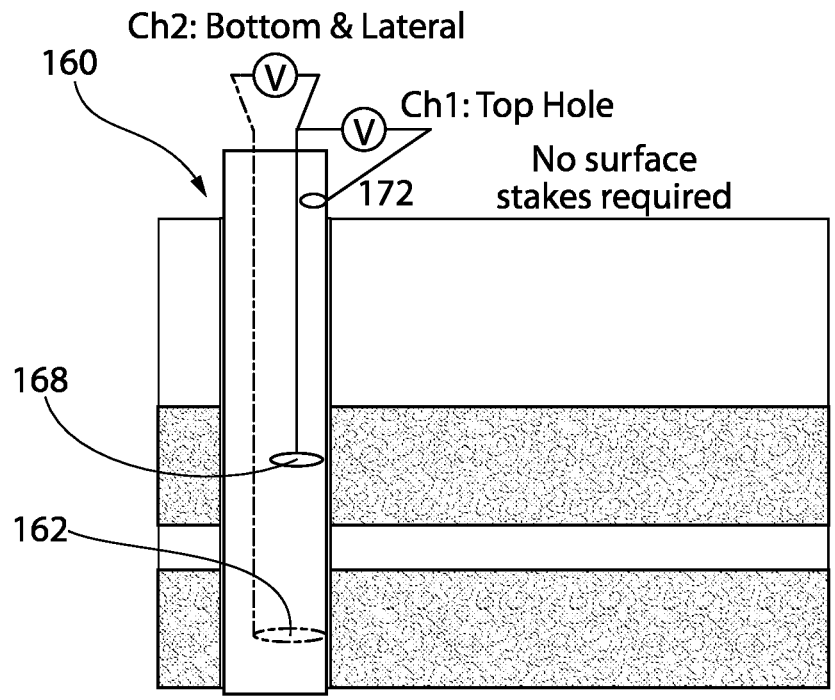
FIG. 3 illustrates a schematic side view of the second wellbore having three sensors, according to an embodiment.

FIG. 3 illustrates a schematic side view of the second wellbore 160 having three sensors 162, 168, 172, according to an embodiment. The third sensor 172 may be positioned proximate to the top of the second wellbore 160 (e.g., coupled to the casing 166, wellhead, or BOP). The second and third sensors 168, 172 may be used to measure the EM telemetry signal 132 from the downhole tool 120 when the downhole tool 120 is in a first, upper interval in the first wellbore 110 (e.g., when the depth of the downhole tool 120 is less than the depth of the second sensor 168). The first and second sensors 162, 168 may then be used to measure the EM telemetry signal 132 from the downhole tool 120 when the downhole tool 120 is in a second, lower interval in the first wellbore 110 (e.g., when the depth of the downhole tool 120 is greater than the depth of the second sensor 168). In one embodiment, the computer system 1000 may be or include a multi-channel acquisition system that uses the signals from the sensors 162, 168, 172 to remove noise with a noise-cancelation algorithm to maximize the SNR.

Figure 4:
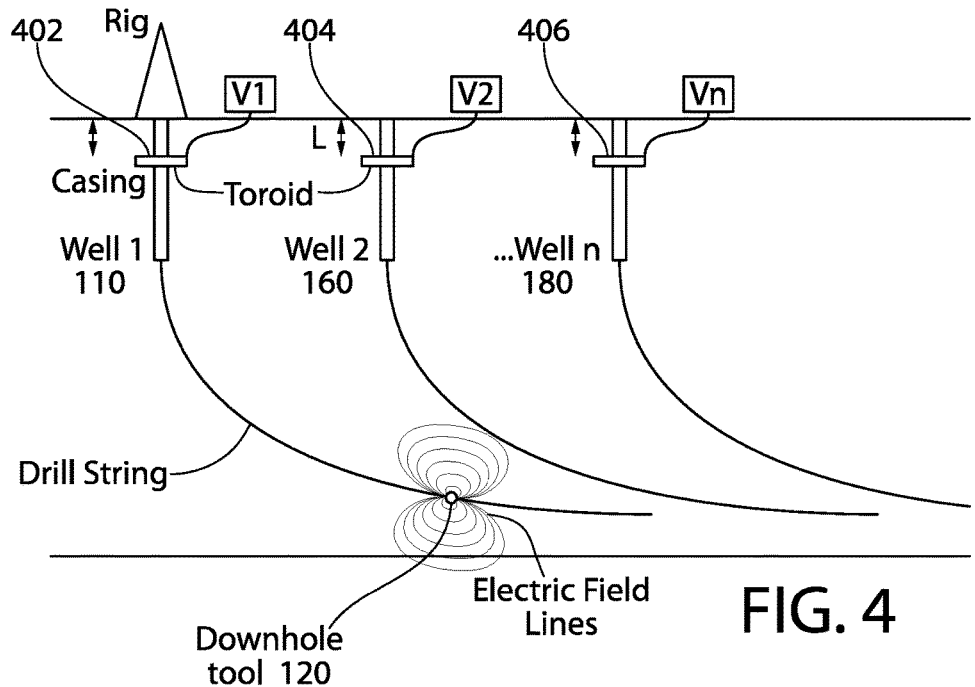
FIG. 4 illustrates a schematic side view of a wellsite showing toroidal coil sensors positioned in a plurality of wellbores, according to an embodiment.

FIG. 4 illustrates a schematic side view of a wellsite showing toroidal coil sensors 402, 404, 406 positioned in the wellbores 110, 160, 180, according to an embodiment. In one embodiment, one or more toroidal coil sensors 402, 404, 406 may be positioned in the first wellbore 110, the second wellbore 160, additional wellbores 180, or a combination thereof. The toroidal coil sensors 402, 404, 406 may be used instead of, or in addition to, the sensors 144, 146, 162, 168 discussed above.

The toroidal coil sensors 402, 404, 406 may be positioned greater than or equal to a predetermined depth to reduce the magnitude of the noise signals 142 detected from the surface equipment 140. The predetermined depth may be greater than about 20 m, greater than about 40 m, or greater than about 60 m. The toroidal coil sensors 402, 404, 406 may be made from a low frequency, high permeability silicon steel with a plurality of turns of copper wire wrapped helically the steel. The steel may have a permeability of many times that of free space, and the core may serve to reduce the magnetizing current and confine the flux to a path that closely couples the windings. An antenna portion of the toroidal coil sensors 402, 404, 406 may be covered with an elastomer (e.g., rubber) to protect the antenna portion from liquids.

Figure 5:
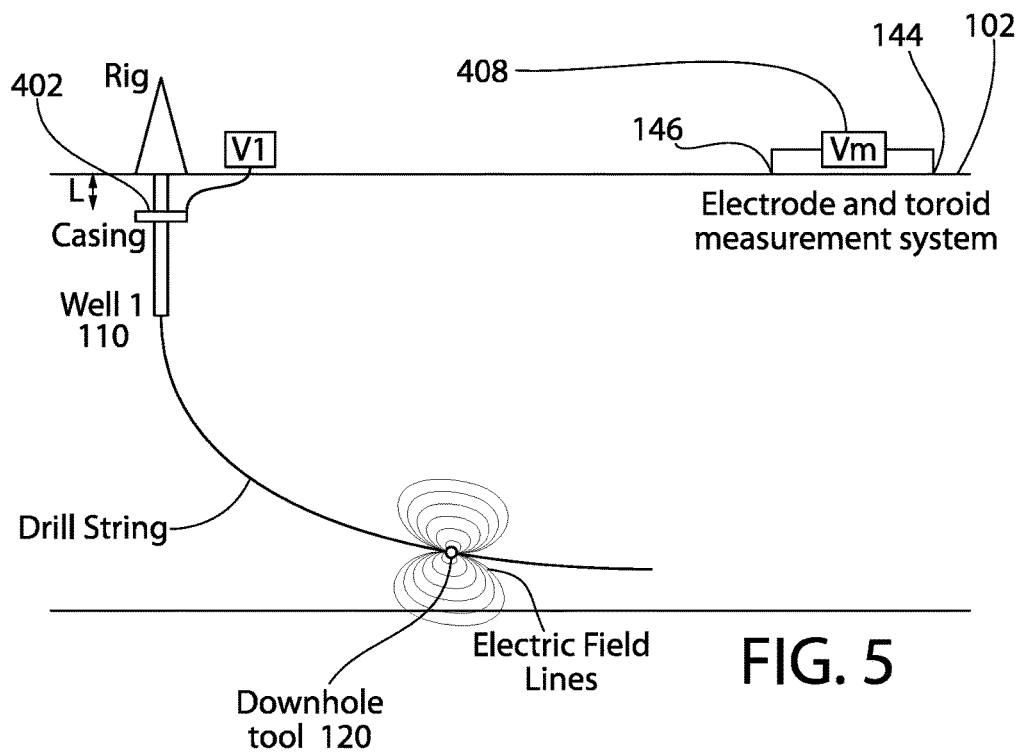
FIG. 5 illustrates a toroidal coil sensor positioned at the surface, according to an embodiment.
Figure 6:
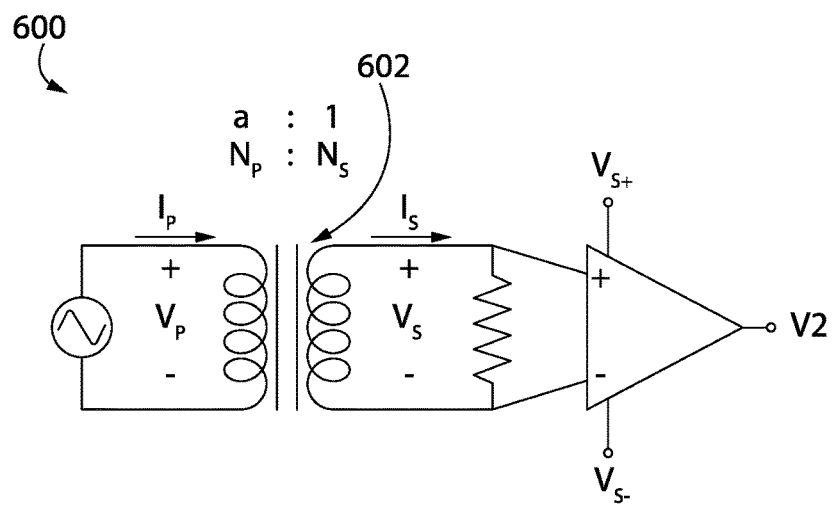
FIG. 6 illustrates a schematic view of a circuit that may be coupled to the toroidal coil sensor of FIG. 5, according to an embodiment.

FIG. 5 illustrates a toroidal coil sensor 408 positioned at the surface 102, according to an embodiment. The toroidal coil sensor 408 may be coupled to the sensors 144, 146 at the surface 102 (e.g., via a wire). FIG. 6 illustrates a schematic view of a circuit 600 that may be coupled to the toroidal coil sensor 408. The circuit 600 may include a resistor across the inputs that is selected to have a value which may result in the aggregate parallel impedance of the front end being about 50 ohms or that used by the chosen differential amplifier. The circuit 600 may include a transformer 602 that operates a sub-audio frequencies. The circuit 600 is merely one example, as there may be other low impedance front ends that may be used.

To optimize production in unconventional wellbores, the well placement trajectory may be maximized across the target formation layer (i.e., pay zone). Unconventional wellbores may be or include long lateral wellbores in shale formations. Drilling outside the pay zone layer may be unproductive. Therefore, the MWD tool 128 may include geo-steering technology to provide the operator at the surface 102 with information about the subterranean formation 104 around the downhole tool 120. The operator may then downlink commands to the downhole tool 120 to steer the downhole tool 120 toward the pay zone layer.

Figure 7A:
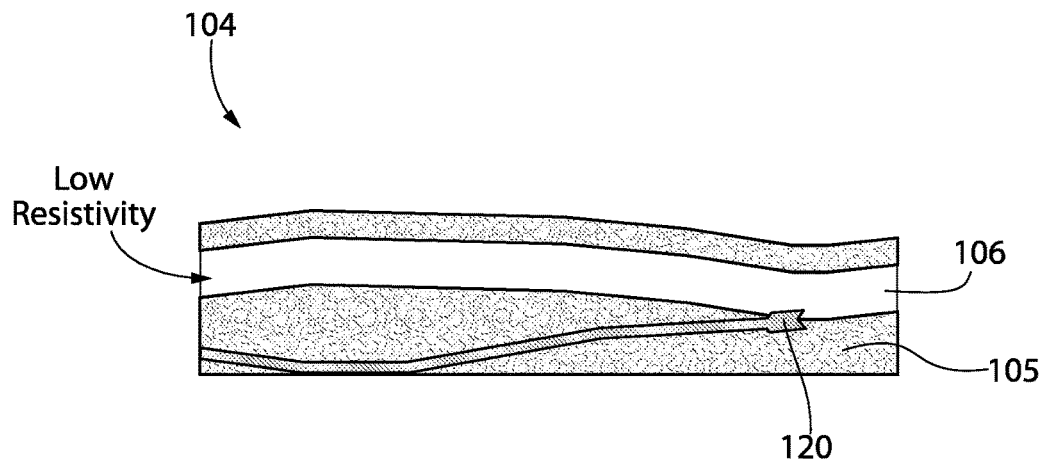
FIG. 7A illustrates a schematic side view of a downhole tool drilling through a pay zone layer of a subterranean formation, according to an embodiment.

FIG. 7A illustrates a schematic side view of the downhole tool 120 drilling through a pay zone layer 105 of the subterranean formation 104, according to an embodiment. As the downhole tool 120 travels through the subterranean formation 104, the magnitude of the EM telemetry signal 132 that the downhole tool 120 is able to produce may depend at least partially upon the resistivity of the layer. In general, the pay zone layer 105 may have a high resistivity, which causes the downhole tool 120 to transmit the EM telemetry signal 132 having a small amplitude (e.g., for a constant-voltage transmitter). As a result, the EM telemetry signal 132 measured by the sensors 162, 168 may have a small amplitude. The formation layers 106 above and below the pay zone layer 105 may have a lower resistivity (i.e., be more conductive) than the pay zone layer 105. Once the downhole tool 120 exits the pay zone layer 105, the magnitude of the EM telemetry signal 132 may increase, causing the amplitude of the EM telemetry signal 132 measured by the sensors 162, 168 to increase. The amplitude change takes place immediately as the bit makes contact with a formation of different resistivity. Therefore, the geo-steering indication takes place early compared to other geo-steering methods in which the sensor is multiple meters behind the bit.

The computer system 1000 may run an algorithm to detect when the downhole tool 120 is inside the pay zone layer 105 and when the downhole tool 120 passes out of the pay zone layer 105. The algorithm may include a low pass filter to reduce instantaneous noise, and then compute statistics to determine a "geo-steering threshold" 133 (see FIG. 7B). An alert (e.g., a flag) may then be produced when the downhole tool 120 leaves the pay zone layer 105. In response, the operator may downlink a command to the downhole tool 120 to alter the trajectory of the downhole tool 120 to remain within, or head back toward, the pay zone layer 105. Additional information (e.g., gamma ray count, azimuth, inclination, etc.) may be used to confirm whether the downhole tool 120 is inside or outside the pay zone layer 105.

Figure 7B:
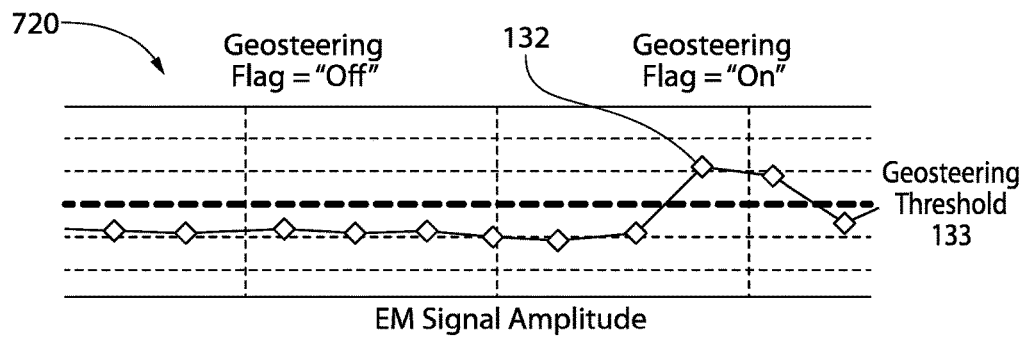
FIG. 7B illustrates a graph showing the amplitude of the current sensed by the sensors as the downhole tool travels through the subterranean formation, according to an embodiment.
Figure 7C:
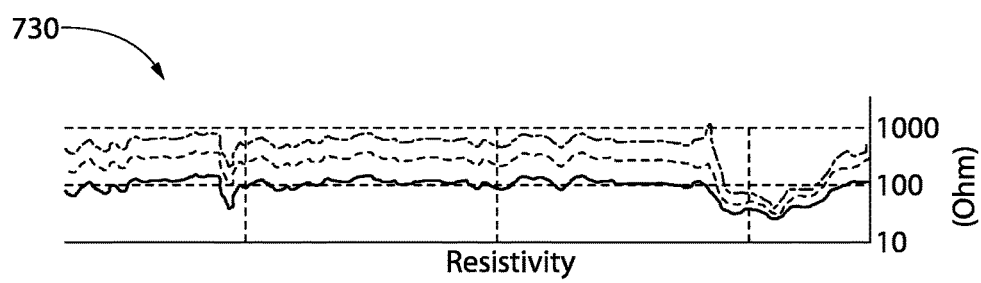
FIG. 7C illustrates a graph showing the resistivity of the subterranean formation surrounding the downhole tool as the downhole tool travels through the subterranean formation, according to an embodiment.
Figure 7D:
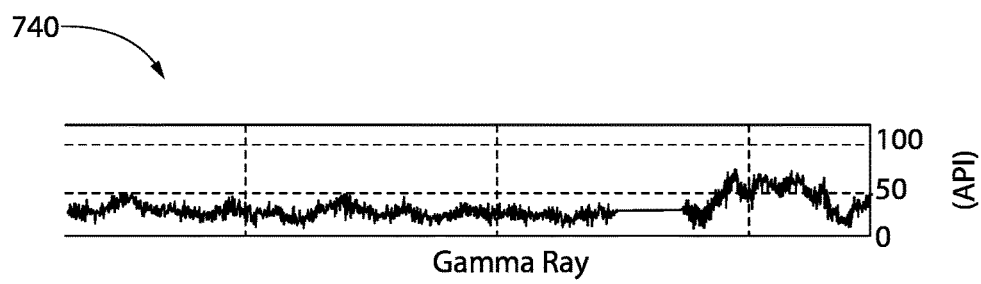
FIG. 7D illustrates a graph showing the gamma ray measurements captured by the downhole tool as the downhole tool travels through the subterranean formation, according to an embodiment.

FIG. 7B illustrates a graph 720 showing the amplitude of the EM telemetry signal 132 sensed by the sensors 162, 168 as the downhole tool 120 travels through the subterranean formation 104, according to an embodiment. As may be seen, the amplitude of the EM telemetry signal 132 in FIG. 7B rises above the geo-steering threshold 133 when the downhole tool 120 exits the pay zone layer 105. FIG. 7C illustrates a graph 730 showing the resistivity of the subterranean formation 104 surrounding the downhole tool 120 as the downhole tool 120 travels through the subterranean formation 104, according to an embodiment. As may be seen, the resistivity of the subterranean formation 104 around the downhole tool 120 decreases when the downhole tool 120 exits the pay zone layer 105. In at least one embodiment, the resistivity data may be omitted. FIG. 7D illustrates a graph 740 showing the gamma ray measurements captured by the downhole tool 120 as the downhole tool 120 travels through the subterranean formation 104, according to an embodiment. As may be seen, the gamma ray measurements increase when the downhole tool 120 exits the pay zone layer 105, confirming the data from the graph 720 in FIG. 7B.

Figure 8:
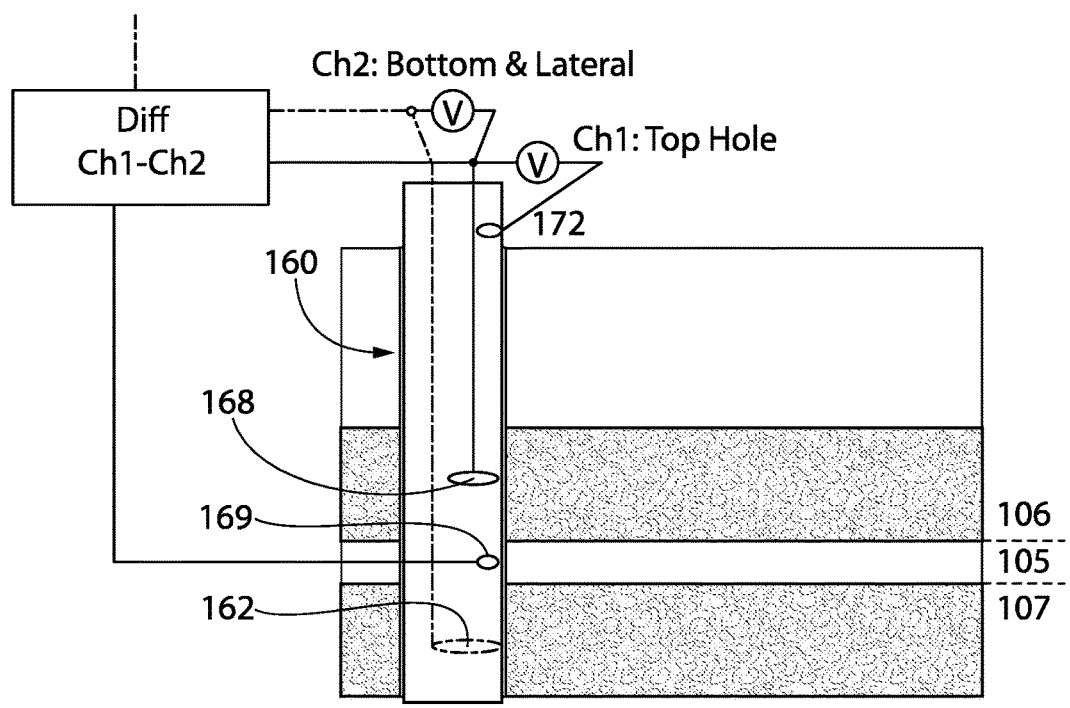
FIG. 8 illustrates a side schematic view of the second wellbore having a plurality of sensors positioned therein, according to an embodiment.

FIG. 8 illustrates a side schematic view of the second wellbore 160 having a plurality of sensors 162, 168, 169, according to an embodiment. There may be logs of the observation wellbore that can indicate were the pay depth is located, and the operator may use this information to locate the sensors 162, 168, 169. The sensors 162, 168, 169 may provide the ability to distinguish directionality (e.g., whether the downhole tool 120 is touching the layer 106 above the pay zone layer 105. The reference sensor 169 may be placed at the depth of the pay zone layer 105. The sensor 162 may be positioned below the pay zone layer 105. The sensor 168 may be positioned above the pay zone layer 105. A signal differential (e.g., voltage) may be measured between the sensors 162, 169 and/or between the sensors 168, 169. It may be determined if/when the downhole tool 120 contacts the layers 106, 107 above and/or below the pay zone layer 105 based at least partially upon the signal differential.

Figure 9:
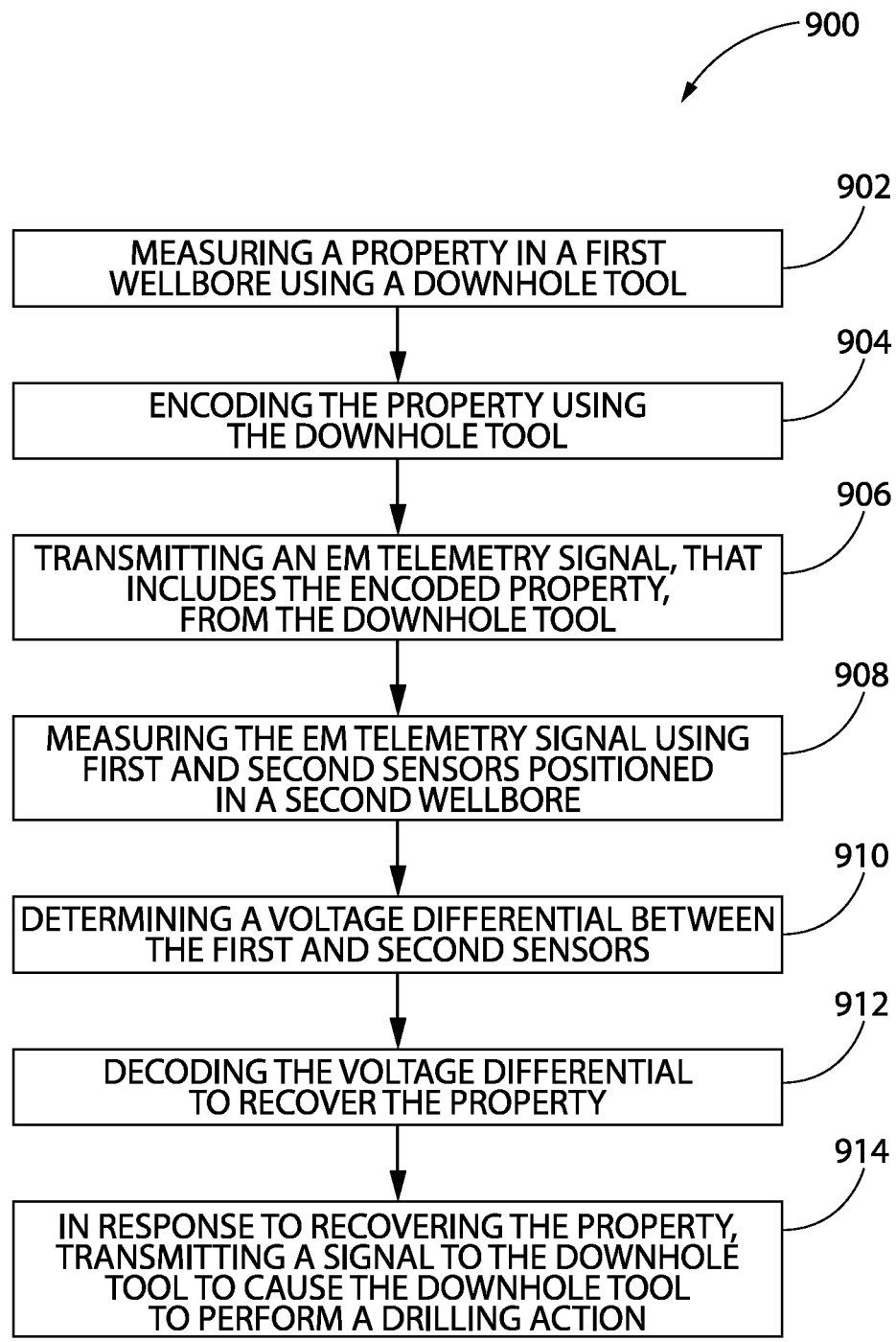
FIG. 9 illustrates a flowchart of a method for recovering data received from the downhole tool in the wellbore, according to an embodiment.

FIG. 9 illustrates a flowchart of a method 900 for recovering data received from a downhole tool 120 in a wellbore 110, according to an embodiment. The method 900 may include measuring a property in a first wellbore 110 using a downhole tool 120, as at 902. The method 900 may also include encoding the property using the downhole tool 120, as at 904. The method 900 may also include transmitting an EM telemetry signal 132 from the downhole tool 120 into a surrounding subterranean formation 104, as at 906. The EM telemetry signal (e.g., the current) may have the property encoded therein.

The method 900 may also include measuring the EM telemetry signal 132 using first and second sensors 162, 168, as at 908. At least one of the first and second sensors 162, 168 may be positioned in a second wellbore 160. The first and second sensors 162, 168 may be in contact with a casing 166 in the second wellbore 160 or in contact with an intermediate conductive member that is in contact with the casing 166, to enable the first and second sensors 162, 168 to measure differential voltage between the location where the sensor 162 is placed and the location where the sensor 168 is placed. The differential voltage is the product of the current flowing in the casing 166 times the casing resistance (i.e., Ohm's law).

The method 900 may also include determining a voltage differential between the first and second sensors 162, 168, as at 910. The voltage differential may be found using:

$$\Delta V = \Delta I * R \quad (1)$$

$$\Delta I = I_2 - I_1 \quad (2)$$

Where $\Delta V$ refers to the voltage differential, $\Delta I$ refers to the current differential between the first and second sensors 162, 168, $I_1$ refers to the current measured by the first sensor 162, $I_2$ refers to the current measured by the second sensor 168, and R refers to the resistance between the first and second sensors 162, 168. In another embodiment, one or more of the sensors 162, 168 may be or include a magnetometer that measures the difference in magnetic fields. When the first and second sensors 162, 168 are both in contact with the casing 166 in the second wellbore 160, the resistance may be dependent upon the length of the casing 166 between the first and second sensors 162, 168 and the conductivity of the casing material. In at least one embodiment, the resistance between the first and second sensors 162, 168 may be from about 1 ohm to about 100 ohms, about 5 ohms to about 75 ohms, or about 10 ohms to about 40 ohms. For example, the resistance may be less than or equal to about 25 ohms.

The method 900 may also include decoding the voltage differential to recover the property, as at 912. A computer system 1000 may be used to decode the voltage differential. The method 900 may also include, in response to decoding the property, transmitting a signal to the downhole tool 120 to cause the downhole tool 120 to perform a drilling action, as at 914. The drilling action may include varying a trajectory of the downhole tool 120 (e.g., to steer the downhole tool 120 into a pay zone layer 105). In another embodiment, the drilling action may include varying a weight-on-bit ("WOB") or RPM of the bit of the downhole tool 120 at one or more locations in the subterranean formation 104. In another embodiment, the drilling action may include varying a flow rate of fluid being pumped into the wellbore 110. In another embodiment, the drilling action may include varying a type (e.g., composition) of the fluid being pumped into the wellbore 110 in response to the property. In another embodiment, the drilling action may include measuring one or more additional properties in the subterranean formation 104 using the downhole tool 120.

In some embodiments, it may be possible to receive a weak uplink EM telemetry signal from the downhole tool 120 while at the same time a strong downlink EM telemetry signal is transmitted to the downhole tool 120 from the surface 102 (e.g., a command). This presents a challenge in conventional EM telemetry because the downlink EM telemetry signal may be directly coupled to the uplink EM telemetry signal because the two surface stakes may be used to transmit and receive. The system and method described herein may reduce the cross-coupling of the weak uplink EM telemetry signal from the strong downlink EM telemetry signal.

Figure 10:
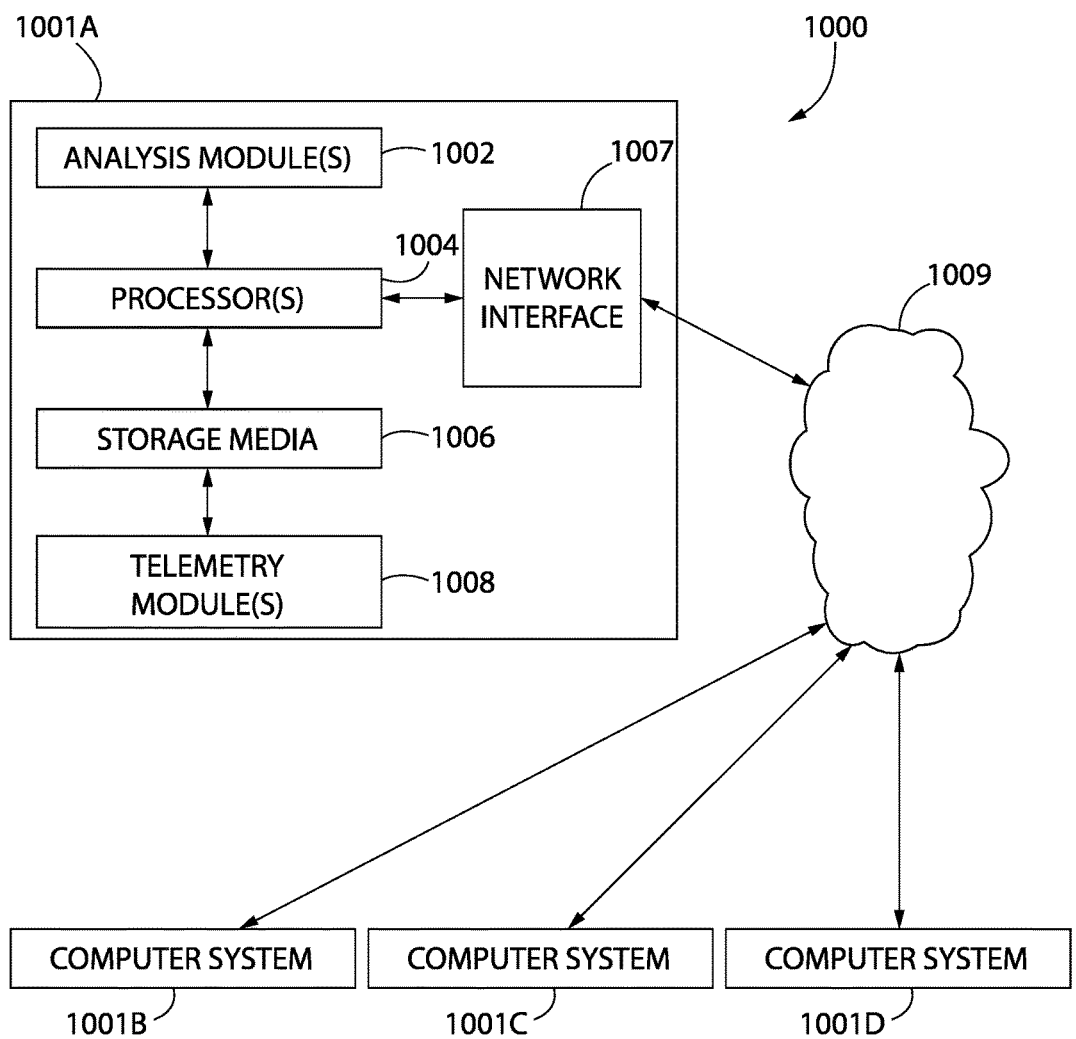
FIG. 10 illustrates a schematic view of a computing system for performing at least a portion of the methods, according to an embodiment.

In some embodiments, the methods of the present disclosure may be executed by a computing system. FIG. 10 illustrates an example of such a computing system 1000, in accordance with some embodiments. The computing system 1000 may include a computer or computer system 1001A, which may be an individual computer system 1001A or an arrangement of distributed computer systems. The computer system 1001A includes one or more analysis modules 1002 that are configured to perform various tasks according to some embodiments, such as one or more methods disclosed herein. To perform these various tasks, the analysis module 1002 executes independently, or in coordination with, one or more processors 1004, which is (or are) connected to one or more storage media 1006. The processor(s) 1004 is (or are) also connected to a network interface 1007 to allow the computer system 1001A to communicate over a data network 1009 with one or more additional computer systems and/or computing systems, such as 1001B, 1001C, and/or 1001D (note that computer systems 1001B, 1001C and/or 1001D may or may not share the same architecture as computer system 1001A, and may be located in different physical locations, e.g., computer systems 1001A and 1001B may be located in a processing facility, while in communication with one or more computer systems such as 1001C and/or 1001D that are located in one or more data centers, and/or located in varying countries on different continents).

A processor may include a microprocessor, microcontroller, processor module or subsystem, programmable integrated circuit, programmable gate array, or another control or computing device.

The storage media 1006 may be implemented as one or more computer-readable or machine-readable storage media. Note that while in the example embodiment of FIG. 10 storage media 1006 is depicted as within computer system 1001A, in some embodiments, storage media 1006 may be distributed within and/or across multiple internal and/or external enclosures of computing system 1001A and/or additional computing systems. Storage media 1006 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLUERAY® disks, or other types of optical storage, or other types of storage devices. Note that the instructions discussed above may be provided on one computer-readable or machine-readable storage medium, or may be provided on multiple computer-readable or machine-readable storage media distributed in a large system having possibly plural nodes. Such computer-readable or machine-readable storage medium or media is (are) considered to be part of an article (or article of manufacture). An article or article of manufacture may refer to any manufactured single component or multiple components. The storage medium or media may be located either in the machine running the machine-readable instructions, or located at a remote site from which machine-readable instructions may be downloaded over a network for execution.

In some embodiments, the computing system 1000 contains one or more telemetry module(s) 1008. The telemetry module(s) 1008 may be used to perform at least a portion of one or more embodiments of the methods disclosed herein (e.g., method 900).

It should be appreciated that computing system 1000 is one example of a computing system, and that computing system 1000 may have more or fewer components than shown, may combine additional components not depicted in the example embodiment of FIG. 10, and/or computing system 1000 may have a different configuration or arrangement of the components depicted in FIG. 10. The various components shown in FIG. 10 may be implemented in hardware, software, or a combination of both hardware and software, including one or more signal processing and/or application specific integrated circuits.

Further, the methods described herein may be implemented by running one or more functional modules in information processing apparatus such as general purpose processors or application specific chips, such as ASICs, FPGAs, PLDs, or other appropriate devices. These modules, combinations of these modules, and/or their combination with general hardware are included within the scope of protection of the disclosure.

As used herein, the terms "inner" and "outer"; "up" and "down"; "upper" and "lower"; "upward" and "downward"; "above" and "below"; "inward" and "outward"; "uphole" and "downhole"; and other like terms as used herein refer to relative positions to one another and are not intended to denote a particular direction or spatial orientation. The terms "couple," "coupled," "connect," "connection," "connected," "in connection with," and "connecting" refer to "in direct connection with" or "in connection with via one or more intermediate elements or members." Similarly, the term "in contact with" refers to "in direct contact with" or "in contact with via one or more intermediate elements or members."

The foregoing description, for purpose of explanation, has been described with reference to specific embodiments. However, the illustrative discussions above are not intended to be exhaustive or to limit the disclosure to the precise forms disclosed. Many modifications and variations are possible in view of the above teachings. Moreover, the order in which the elements of the methods described herein are illustrate and described may be re-arranged, and/or two or more elements may occur simultaneously. The embodiments were chosen and described in order to best explain the principals of the disclosure and its practical applications, to thereby enable others skilled in the art to best utilize the disclosure and various embodiments with various modifications as are suited to the particular use contemplated. Additional information supporting the disclosure is contained in the appendix attached hereto.

What is claimed is:

1. A method for recovering data from a downhole tool in a wellbore, comprising:
    measuring an electromagnetic signal using first and second sensors, wherein at least a portion of the electromagnetic signal is transmitted by the downhole tool positioned in a first wellbore, and wherein the first and second sensors are each positioned at a different location along a length of a second wellbore;
    decoding the electromagnetic signal measured by the first and second sensors to recover a property measured by the downhole tool; and
    wherein the electromagnetic signal is measured by the first and second sensors when the downhole tool is in a first portion of the first wellbore, and said method further comprises measuring the electromagnetic signal using the second sensor and a third sensor when the downhole tool is in a second portion of the first wellbore that is axially-offset from the first portion of the wellbore.

2. The method of claim 1, wherein the first and second sensors are both in contact with an electrically-conductive member that is positioned at least partially within the second wellbore.

3. The method of claim 2, wherein the electrically-conductive member comprises a casing.

4. The method of claim 3, wherein a resistance between the first and second sensors is less than or equal to about 25 ohms.

5. The method of claim 1, wherein the first sensor, the second sensor, or both comprise a toroidal coil.

6. The method of claim 1, further comprising generating an alert when the electromagnetic signal measured by the first and second sensors exceeds a predetermined threshold.

7. The method of claim 6, further comprising transmitting a signal to the downhole tool in response to the alert, wherein the signal directs the downhole tool to steer toward a pay zone layer in a subterranean formation.

8. The method of claim 1, further comprising transmitting a signal to the downhole tool in response to recovering the property, wherein the signal causes the downhole tool to perform a drilling action.

9. The method of claim 8, wherein the drilling action is selected from the group consisting of: varying a trajectory of the downhole tool, varying a weight-on-bit of the downhole tool, varying a flow rate of fluid being pumped into the first wellbore, varying a composition of the fluid being pumped into the first wellbore, and measuring an additional property in a subterranean formation using the downhole tool.

10. A system for recovering data from a downhole tool in a wellbore, comprising:
a first sensor configured to measure an electromagnetic signal transmitted by the downhole tool in a first wellbore, wherein the first sensor is in a second wellbore;
a second sensor configured to measure the electromagnetic signal transmitted by the downhole tool, wherein the first and second sensors are each positioned at a different location along a length of the second wellbore;
a third sensor configured to measure current transmitted by the downhole tool, wherein the third sensor is positioned above a subterranean formation and proximate to a top of the second wellbore; and
a computer system configured to determine a voltage differential between the first and second sensors and decode the voltage differential to recover a property measured by the downhole tool.

11. The system of claim 10, wherein the first sensor is in contact with a casing in the second wellbore.

12. The system of claim 11, wherein the second sensor is also in contact with the casing, and wherein a resistance between the first and second sensors is less than or equal to about 25 ohms.

13. The system of claim 10, wherein the first sensor, the second sensor, or both comprise a toroidal coil.

14. A method for recovering data from a downhole tool in a wellbore, comprising:
transmitting an electromagnetic signal from a downhole tool in a first wellbore to a second wellbore, the second wellbore intersecting a subterranean payzone;
measuring the electromagnetic signal using first and second sensors deployed in the second wellbore, the first sensor being deployed above the payzone and the second sensor being deployed below the payzone;
decoding the electromagnetic signal measured by the first and second sensors to recover a property measured by the downhole tool; and
evaluating amplitudes of the electromagnetic signals measured at the first and second sensors to determine a location of the downhole tool relative to the payzone.

15. The method of claim 14, wherein the first and second sensors are each in contact with an electrically-conductive casing that is positioned at least partially within the second wellbore.

16. The method of claim 14, wherein the amplitudes of the electromagnetic signals measured at the first and second sensors are both small when the first wellbore is located in the payzone.

17. The method of claim 14, wherein the amplitude of the electromagnetic signal measured at one of the first or second sensors increases when the first wellbore exits the payzone.

18. The method of claim 14, further comprising
altering a trajectory of a downhole tool when the evaluated amplitudes indicate that the downhole tool is above or below the payzone.

* * * * *